(12) United States Patent
Stingel, III et al.

(10) Patent No.: US 7,200,465 B2
(45) Date of Patent: Apr. 3, 2007

(54) AUTOMATED CONTAINER STORAGE AND DELIVERY SYSTEM

(76) Inventors: Frederick J. Stingel, III, 614 Holt La., Asheville, NC (US) 28803; Jeffrey W. Stingel, 1408 Kenton La., Asheville, NC (US) 28803; James N. Smith, 9936 Baileywick Rd., Raleigh, NC (US) 27613

( * ) Notice: Subject to any disclaimer, the term of this patent is extended or adjusted under 35 U.S.C. 154(b) by 203 days.

(21) Appl. No.: 10/370,548

(22) Filed: Feb. 20, 2003

(65) Prior Publication Data
US 2003/0176944 A1    Sep. 18, 2003

Related U.S. Application Data

(62) Division of application No. 10/098,160, filed on Mar. 13, 2002, now Pat. No. 6,729,836.

(51) Int. Cl.
*G06F 7/00* (2006.01)
(52) U.S. Cl. .................. 700/217; 700/216; 414/802; 414/788.4
(58) Field of Classification Search ............ 414/791.6, 414/788.4, 789.6, 902; 198/347.1; 700/216, 700/217, 218, 219
See application file for complete search history.

(56) References Cited

U.S. PATENT DOCUMENTS

| 3,262,584 | A | | 7/1966 | Hayford, Jr. et al. |
|---|---|---|---|---|
| 4,621,745 | A | | 11/1986 | Grace |
| 4,941,374 | A | | 7/1990 | Focke |
| 5,501,571 | A | * | 3/1996 | Van Durrett et al. ....... 414/801 |
| 5,636,966 | A | | 6/1997 | Lyon et al. |
| 5,733,098 | A | | 3/1998 | Lyon et al. |
| 5,903,464 | A | | 5/1999 | Stingel, Jr. et al. |
| 5,934,864 | A | | 8/1999 | Lyon et al. |
| 5,996,316 | A | | 12/1999 | Kirschner |
| 6,186,724 | B1 | | 2/2001 | Hollander |
| 6,450,751 | B1 | | 9/2002 | Hollander |

OTHER PUBLICATIONS

Layer Picking, Universal layer picker for mixed pallets brochure, Univeyor, Leicester, U.K.
SI ITEMatic Systems brochure, SI Handling Systems, Inc., Easton, Pennsylvania.

* cited by examiner

*Primary Examiner*—Khoi H. Tran
(74) *Attorney, Agent, or Firm*—Akerman Senterfitt; J. Rodman Steele, Jr.; Michael K. Dixon

(57) ABSTRACT

A material storage and delivery system includes an individual container storage and delivery system (ICSDS). A palletizer is provided for placing containers from the ICSDS on a pallet. A layer storage and delivery system (LSDS) places full layers of containers on a pallet. A robotic container delivery system (RCDS) places individual containers on a pallet. A conveyor system conveys containers and pallets between at least two of the ICSDS, the palletizer, the LSDS and the RCDS. A method for storing and delivering containers is also disclosed.

11 Claims, 6 Drawing Sheets

AUTOMATED CONTAINER STORAGE AND DELIVERY SYSTEM

CROSS-REFERENCE TO RELATED APPLICATIONS

This application is a divisional application of U.S. patent application Ser. No. 10/098,160, filed Mar. 13, 2002 now U.S. Pat. No. 6,729,836.

FIELD OF THE INVENTION

This invention relates generally to material handling systems, and more particularly to automated container storage and delivery systems.

BACKGROUND OF THE INVENTION

Manufacturers, retailers, and distributors must store and deliver great quantities of goods at a time. Many such users have hundreds if not thousands of products. Orders are received from customers and material handling systems must locate inventory and then route inventory necessary to fill the orders to an appropriate location for shipping or delivery. Through-put is a concern as sometimes many thousands of containers per hour must be processed through a single facility. Intelligent control systems have been developed to track customer orders, inventory, and the routing of the inventory necessary to fill the customer orders. Automation is a solution for reducing the amount of manual labor necessary to fill such orders, as manual labor tends to reduce reliability and through-put, and increases costs.

Individual container storage and delivery systems have been developed which are capable of storing multiple stock keeping units (SKUs) of different products and variations in products, such as size, color, quantity, and flavoring. Such systems mechanize the process of filling orders for multiple containers having different SKUs in an efficient and reliable manner. Such systems, however, can require a great deal of floor space and can be costly to install and use.

Grace, U.S. Pat. No. 4,621,745, discloses an individual container storage and delivery system (ICSDS) in which a vertically accumulating storage and retrieval system (VASRS) for containers is loaded at the top of a tower and selectively dispenses at the bottom. The tower has a frame that defines first and second tower sections, each supporting a number of vertically spaced shelf trays which in turn support the containers which are stacked on the trays when loaded. The shelf trays of each tower section face inwardly toward and are staggered relative to each other. Each tray is mounted for pivotal movement about a horizontal axis and is operated so that when a container is dispensed from a bottom shelf tray, each higher tray beginning at the bottom and progressing upward one at a time, pivots to transfer its carton to the upwardly tilted, next lower, empty shelf tray. This process is repeated until each container has been transferred to the next lower shelf tray. As a container is loaded at the top of the tower, the shelf trays are operated to pass the container downwardly in a zig-zag fashion from one tray to another until it reaches the highest unloaded shelf tray.

ICSDS systems such as vertically accumulating storage and dispensing apparatus provide an efficient methodology for delivering containers having many different SKUs. However, many customer orders require a few containers having different SKUs, and many containers having the same SKUs. That is, many customer orders require many containers of a few popular SKUs, and then various lesser amounts of containers of less popular SKUs. ICSDS systems deliver the containers typically under computer control to a conveyor system which conveys the containers to a palletizer. At the palletizer, the containers are placed onto a pallet layer-by-layer. It is a time consuming process to deliver individual containers to the palletizer, and to place these containers onto the pallet, even in a fully automated system.

SUMMARY OF THE INVENTION

A material storage and delivery system includes an individual container storage and delivery system (ICSDS). A palletizer places containers from the ICSDS on a pallet. A layer storage and delivery system (LSDS) places full layers of containers on a pallet. A robotic container delivery system (RCDS) places individual containers on a pallet. A conveyor system conveys containers and pallets between the ICSDS, the palletizer, the LSDS, the RCDS, and delivery/shipping.

The ICSDS preferable comprises a vertically accumulating storage and retrieval system. A depalletizer system can be provided for delivering containers to the ICSDS.

The LSDS can include a full layer storage system for storing full layers of containers, and apparatus for taking the full layers of containers and placing the full layers of containers on a pallet. The LSDS can comprise a pallet magazine for delivering empty pallets to a position for receiving the full layers of containers.

A control system is provided for delivering containers and pallets bearing containers between the ICSDS, the palletizer, the LSDS, the RCDS, and shipping or delivery. The control system can receive inventory data and order data. The inventory data preferably comprises container position data in the ICSDS. The control system can determine pallet configurations from the order data. The pallet configurations can comprise the number of full layers of containers having homogeneous SKU's and whether such layers can be provided by the LSDS. The control system, if the number of homogeneous SKU layers in the order is available from the LSDS and exceeds a predetermined threshold, can direct the LSDS to place the requested number of homogeneous SKU layers on a pallet. The control system can direct a pallet having the homogeneous SKU layers to the RCDS and cause the RCDS to place heterogeneous layers of containers on the pallet in addition to the homogeneous SKU layers that were placed on the pallet by the LSDS. The control system can alternatively direct the pallet from the LSDS to the palletizer.

The control system can direct pallets from the palletizer to the RCDS and cause the RCDS to place heterogeneous layers of containers on the pallet. The control system will, if the number of homogeneous layers of containers requested by the order does not exceed the predetermined threshold, cause the ICSDS to deliver an equivalent number of the containers to the palletizer for placement on a pallet.

The control system can determine the number of homogeneous package type layers of containers and, if the number of homogeneous package type layers requested by the order is above a threshold, direct the containers to be sent to the palletizer and, if below a threshold or if the containers are not of homogeneous package type, cause the containers to be sent to the RCDS. If the control system determines that homogeneous SKU layers are also necessary, it can direct the pallet from the palletizer to the LSDS and direct the LSDS to place the homogeneous SKU layers of containers on the pallet. If additional containers are necessary to complete the pallet, the control system directs the pallet to the RCDS to place incomplete layers of containers or containers having heterogeneous package type onto the pallet.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

Figure 1:
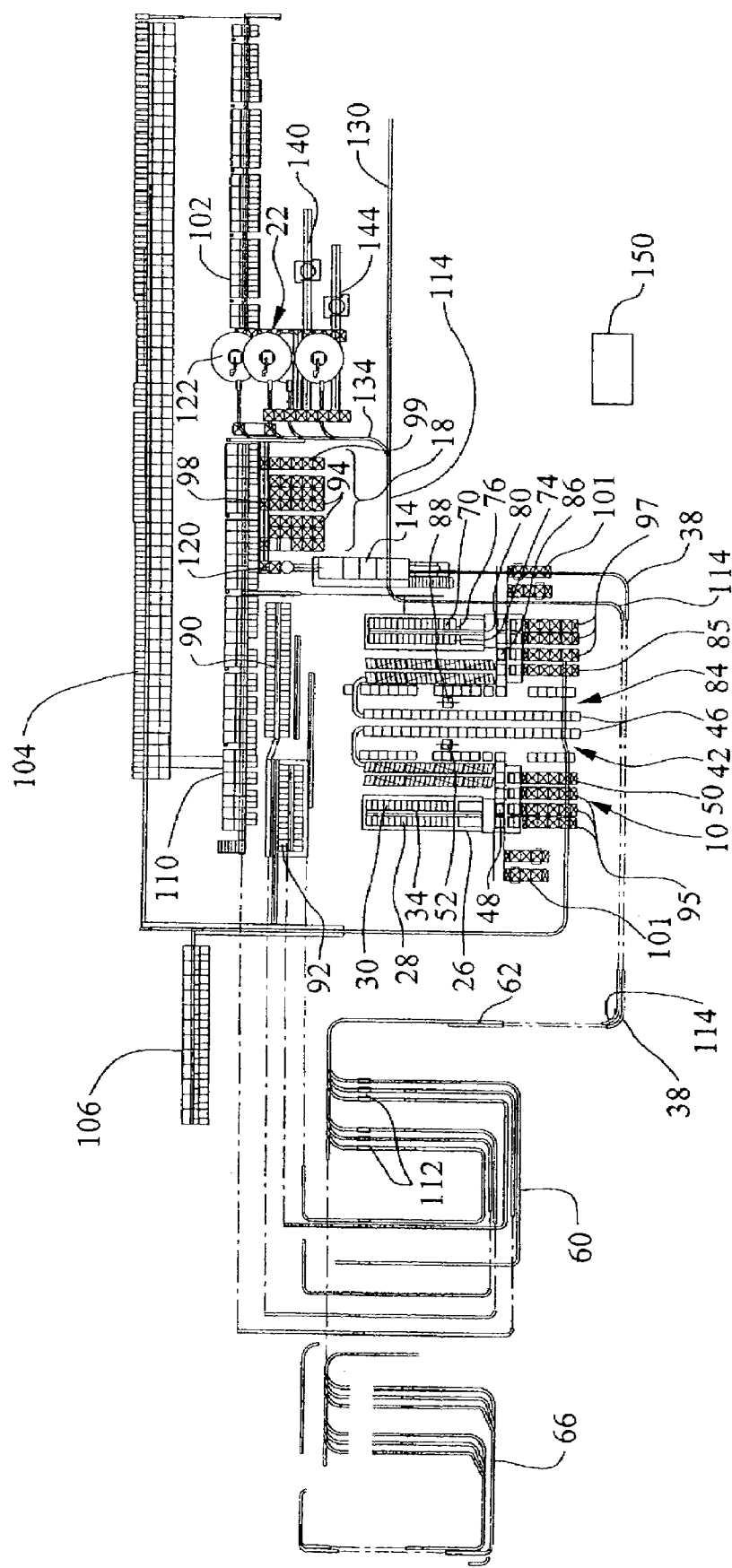
FIG. 1 is a top plan, exploded schematic of an automated storage and delivery system according to the invention.

A top plan schematic of an automated storage and retrieval system according to the invention is shown in FIG. 1. The system comprises an individual container storage and delivery system (ICSDS) 10. A palletizer 14 receives containers from the ICSDS 10 and places them onto a pallet. A layer storage and delivery system (LSDS) 18 places full layers of containers on a pallet. A robotic container delivery system (RCDS) 22 places individual containers onto a pallet.

The term "container" is used herein generally, and can refer to almost any type of goods for which material handling is necessary. The invention is useful for beverage containers and product containers of many different sizes and shapes. The invention is also useful for the handling of containers within containers, as when cans of beverages are provided in packages, and such packages are in provided in cases. The invention can also be used to move goods themselves, where such goods may not be in a container as such.

The ICSDS 10 is capable of storing many individual containers and delivering selected ones of the containers upon demand. Any suitable ICSDS can be used, however, a currently preferred ICSDS includes the vertically accumulating storage and dispensing apparatus described by Grace, U.S. Pat. No. 4,621,745, the disclosure of which is incorporated herein fully by reference. This vertically accumulating storage and retrieval system (VASRS) is currently sold under the trademark VERTIQUE® by Vertique, Inc of Arden, N.C. This system incorporates towers of pivoting, vertically spaced shelf trays which support containers and transport the containers downwardly in zig-zag fashion. Thus, this VASRS system is capable of storing individual containers in vertically oriented towers, and then dispensing the goods from the bottom of the tower onto a discharge conveyer. Containers are directed into the top of the towers by a supply conveyor. Suitable diverting or container directing apparatus directs the containers into an appropriate tower. The towers are typically aligned in rows such that one supply conveyor can service a row of towers or, in an alternative embodiment, a bank of towers can have a row of towers on each side of the supply conveyor such that one supply conveyor can service two rows of opposing towers. Similarly, a single discharge conveyor at the bottom of the towers can receive containers from a row of towers or, in the alternative embodiment, from opposing rows of towers on each side of the discharge conveyor.

There are many different VASRS, including those that are pneumatically operated, electronically operated, that have two position trays, and the like. Any such VASRS can be used. Others are also possible. Further, other ICSDS systems can be used with the invention. Systems such as gravity flow conveyors systems are known for individual container storage and delivery applications. Such systems and others can be used with the invention.

The ICSDS 10 shown in FIG. 1 is only one of many different possible configurations, and is intended only for purposes of illustration. The ICSDS 10 includes a first bank 26 of VASRS towers comprising a first row 28 of towers and a second row 30 of towers that is substantially parallel to the row 28. A supply conveyor 34 delivers containers to the top of the towers in the rows 28 and 30. A discharge conveyor (not shown) below the supply conveyor 34 receives containers from the bottom of each tower in rows 28 and 30. Containers taken from the VASRS bank 26 are transported by a queuing conveyor system 60. The queuing conveyor system 60 delivers the containers to a merge 62, and a conveyor 38 delivers the containers to the palletizer 14.

The bank 26 can be replenished with containers from a pallet storage area 42. Within the pallet storage area 42, there are a plurality of pallet storage positions 46. A gantry 48 removes containers from pallets delivered by a pallet supply conveyor 50, and places the containers on a conveyor line which takes the containers to the supply conveyor 34 and the VASRS bank 26. Not all of the containers will usually be removed from pallets by the gantry 48, as only the number of containers necessary to replenish the towers will be removed. The pallets with the remaining containers are taken by an automated storage and retrieval system (ASRS) 52 to one of the pallet storage positions 46. Containers are taken from the pallet storage area 42 by the ASRS 52 and the gantry 48. The ASRS 52 retrieves the necessary pallet from the appropriate pallet storage position 46 and brings it to the gantry 48. The gantry 48 removes the necessary number of layers of containers from the pallet and places them on a conveyor for delivery to the VASRS bank 26. The ASRS 52 then brings the pallet back to the storage position 46, unless the pallet is empty, in which case the empty pallet is retrieved for reuse. Other pallet storage and retrieval systems can be used with the invention.

The system can operate with any number of ICSDS systems or components that are interconnected with appropriate conveying systems. In the example shown in FIG. 1, the ICSDS 10 is provided with another bank 70 of VASRS towers 74, 76, which are serviced by a supply conveyor 80. Bank 70 can be replenished with containers from pallets retrieved from the pallet storage area 42 or from a separate pallet storage area 84 that is dedicated to the VASRS bank 70 and receives pallets of containers from pallet supply conveyor 85. Similarly, a gantry 86 can be used to depalletize the containers, and an ASRS 88 can be provided to store and retrieve pallets bearing containers to and from the gantry 86 and storage positions 46 associated with the pallet storage area 84.

Any number of additional VASRS banks can be provided depending on system requirements. Also, the number of towers and the number of tray positions in the towers can be varied. In the example that is shown, additional VASRS banks 90 and 92 are provided and receive containers that are removed from pallets by the gantry 48 and the gantry 86.

The VASRS banks 26, 70, 90 and 92 are fully automated in the example, that is, both the supply and discharge of containers from the banks is controlled entirely by the control system. In cases where the demand for certain containers is relatively low, the expense of a fully automated system for such containers can be partially avoided. In the embodiment shown, a bank 102 of VASRS towers is utilized to discharge containers on demand to a conveyor which carries the containers to the queuing conveyor 60. The VASRS bank 102 is semi-automated and manually replenished with containers whenever a particular tower needs replenishment. The discharge function from each tower is automatic and under the control of the control system. Additional semi-automated banks 104 and 106 can be connected by conveyors to deliver goods through a common conveyor line with the bank 102 to the queuing conveyor system 60. Another semi-automated bank 110 can be connected by a suitable conveyor line to the queuing conveyor system 60. The four fully automated VASRS banks 26, 70, 90 and 92, the connected semi-automated VASRS banks 102, 104, and 106, and the VASRS bank 110 create six lanes of conveyor lines 112 in the queuing conveyor system 60, which then transports the cases to the palletizer 14 by conveyor 38 or other parts of the system by conveyor 114. Other VASRS bank and conveyor configurations are possible.

The palletizer 14 can be of any construction suitable for taking individual containers and loading them onto a pallet as layers. Palletizers currently exist for handling a wide variety of container sizes, shapes, and weights. One suitable palletizer is the PAI 6300 that is manufactured by Production Automation Inc. of Montgomery Ala. The palletizer 14 takes containers that are of a homogeneous package type and forms the layer from individual containers, and then places the formed layers onto a pallet. The homogeneity of containers for a layer depends generally on the containers having substantially the same height, width and length to permit the palletizer to form the layer without individual case placement. At the palletizer the cases are typically oriented in the same direction such that, for example, the long sides of cases are aligned. In addition to case dimensions, it is also preferable that the containers not differ greatly in weight, since the palletizer may require different settings to handle cases of substantially different weight.

Containers of high volume SKUs must be depalletized from supply pallets and re-palletized to a delivery pallet on a frequent basis. For these SKUs, a high throughput system includes a replenishment conveyor system 66. Pallet supply conveyors 95 bring pallets of such high demand SKUs to the gantry 48. Pallet supply conveyors 97 bring pallets of high demand containers to the gantry 86. The gantry 48 and the gantry 86 remove containers from these pallets and deliver them to the replenishment conveyor system 66. The replenishment conveyor system 66 delivers the containers to the merge 62, and the conveyor 38 delivers the containers to the palletizer 14. Pallet stackers 101 store and deliver empty pallets on demand.

The layer storage and delivery system (LSDS) 18 can be of any construction suitable for taking layers of containers and placing them onto a delivery pallet. The LSDS 18 can include a plurality of layer storage positions 94 which can be supply conveyors having thereon pallets with containers. In the usual case, each layer storage position 94 will have only containers with homogeneous SKUs. The term SKU is used herein generally to refer to packages which are viewed to be interchangeable, if not identical. This typically requires that the containers have substantially the same product, in substantially the same quantity, and in substantially the same packaging. It is known to identify containers having only minor distinctions with the same SKU, for example, where different package coloring schemes are presented for aesthetic purposes or as a form of advertisement. If the layers are not homogeneous with respect to SKU, the control system must be able to track which SKUs are in the layers such that the system will be able to determine which containers are being placed onto a delivery pallet, and the order must require all of the containers that are in the non-homogeneous layer. It will be appreciated by those skilled in the art that the invention is not limited to systems using SKUs, so long as the system is capable of identifying containers within the system.

The LSDS 18 includes a suitable mechanical device such as gantry 98 to remove layers from pallets in the layer storage positions 94 and place them onto a delivery pallet. Empty pallets can be delivered to the LSDS 18 by a conveyor 99.

The robotic container delivery system (RCDS) 22 can be any suitable structure capable of placing individual containers onto a pallet in an intelligent, container-by-container process. One suitable device is the Fanuc Robot M-410 iHS of Rochester Hills, Mich. The RCDS 22 takes individual containers and places them onto a delivery pallet in a position best suited to fit the pallet. The RCDS 22 is effective to place containers of a variety of sizes and shapes on top of the full layers that have been placed onto the delivery pallet by the palletizer 14 or the LSDS 18. The RCDS 22 can also place full layers onto a pallet, but the process is generally much slower than the palletizer 14 or the LSDS 18. Containers with heterogeneous package types have different container characteristics such as dimension, shape and weight. The control system must process the container information in order to direct the RCDS 22 as to how to fit the containers onto the pallet. In the example of containers having different container shapes and sizes, this may involve processing to instruct the RCDS 22 how to position and orient the containers so as to fit the available space. The RCDS 22 can also be used to place less than a full layer of containers on the top of a pallet prior to shipment. This incomplete layer can consist of identical containers or different containers. In the example of an incomplete layer, this can include positioning the containers for maximum stability on the pallet. Appropriate computer control can be utilized to fit the containers which must be placed onto the pallet in a manner which fits both the geometry of the containers and the layer.

The RCDS 22 can be supplied with containers by any suitable method. In the present example, containers delivered to the merge 62 can be routed to a conveyor 114 which takes the containers to the RCDS by way of a branching conveyor system 134.

Suitable conveying systems are provided to conduct containers and pallets through the system. It will be appreciated that any number of systems capable of moving pallets and containers would be suitable for the invention. A conveyor system 120 can be used to transport pallets between the palletizer 14 and the LSDS 18 or the RCDS 22. A conveyor system 122 can carry pallets between the LSDS 18 and the RCDS 22. A conveyor system 130 can branch from the conveyor 114 and carry urgent deliveries directly to the shipping area. A conveyor system 140 can carry pallets from the RCDS 22 to shipping. One or more shrink-wrapping stations 144 can be used to wrap the pallets if desired.

A control system 150 can be provided to control the operation of the system and the movement of containers and pallets through the system. The control system 150 is typically a computer system that is used to operate motors and switches to direct containers and pallets through the system by methods known in the art. The control system 150 has appropriate memory and processing capability to track the location of containers in the material storage and delivery system, and to process this information according to the principles discussed herein to route the containers and pallets to the appropriate places at the appropriate times. Although the control system 150 is shown as a single system, it will be appreciated that one or more computers or programable logic controllers (PLCs) could be used in tandem to perform the control according to the invention.

Figure 2:
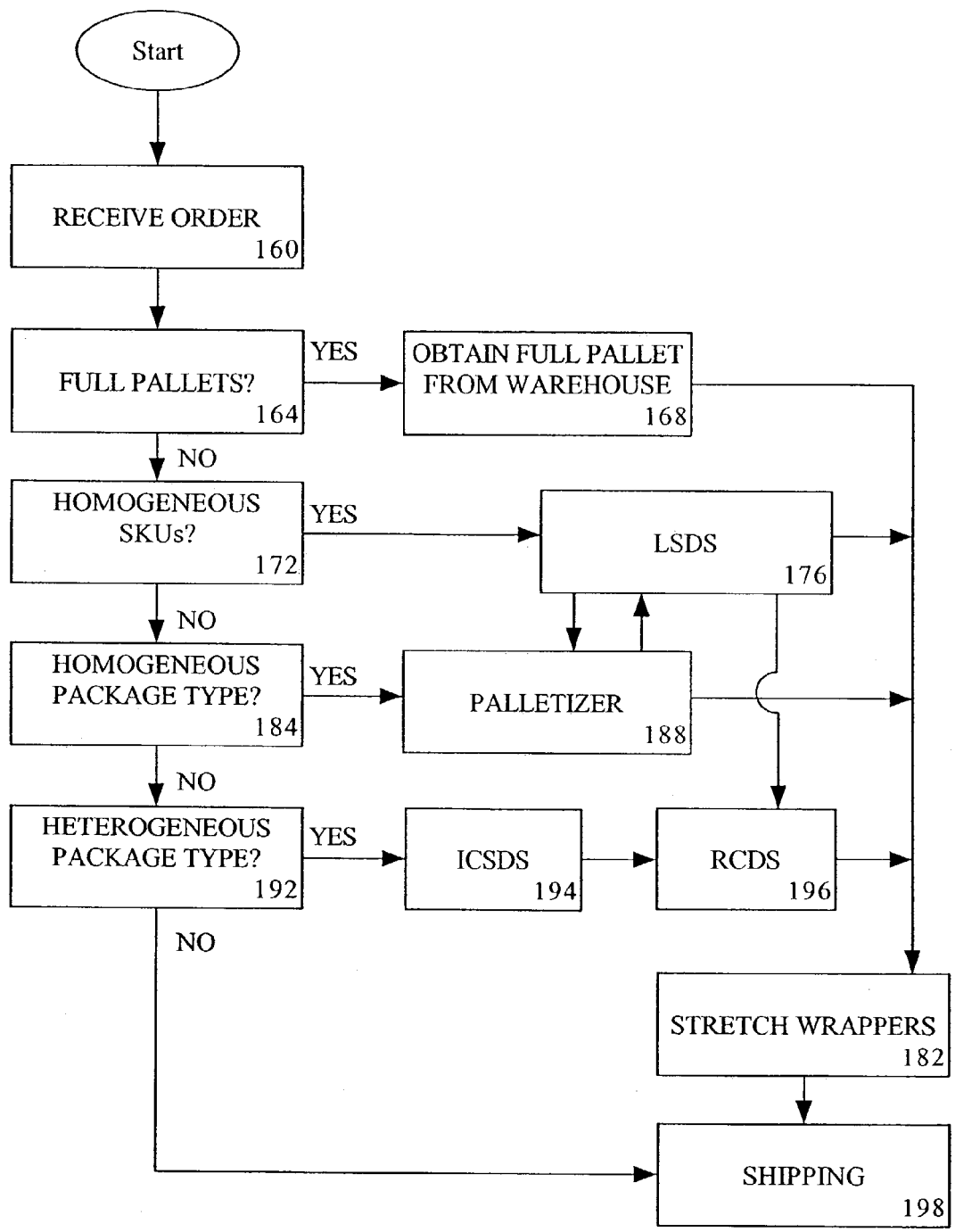
FIG. 2 is a block diagram illustrating a method for delivering containers for customer orders according to the invention.

A method for processing orders for containers according to the invention is illustrated by the block diagram of FIG. 2. An order is received at step 160. It is determined in step 164 if full pallets of containers are necessary to fill the order. If so, the full pallets are obtained directly from the warehouse or storage area in step 168, and the method then progresses to a shipping or delivery step 193. Stretch wrapping or other pallet preparation steps can be performed in step 182. It is determined in step 172 if full layers of homogeneous SKUs are necessary for the order and, if so, these are filled by the LSDS at step 176. At step 184, it is determined if the order requires layers of homogeneous package type. These are filled at the palletizer 14 at step 188. At step 192, it is determined if the order requires heterogeneous package type and, if so, these containers are provided by the ICSDS at step 194 to be placed onto a pallet by the RCDS 22 at step 196. The order is then shipped in step 198.

Figure 3:
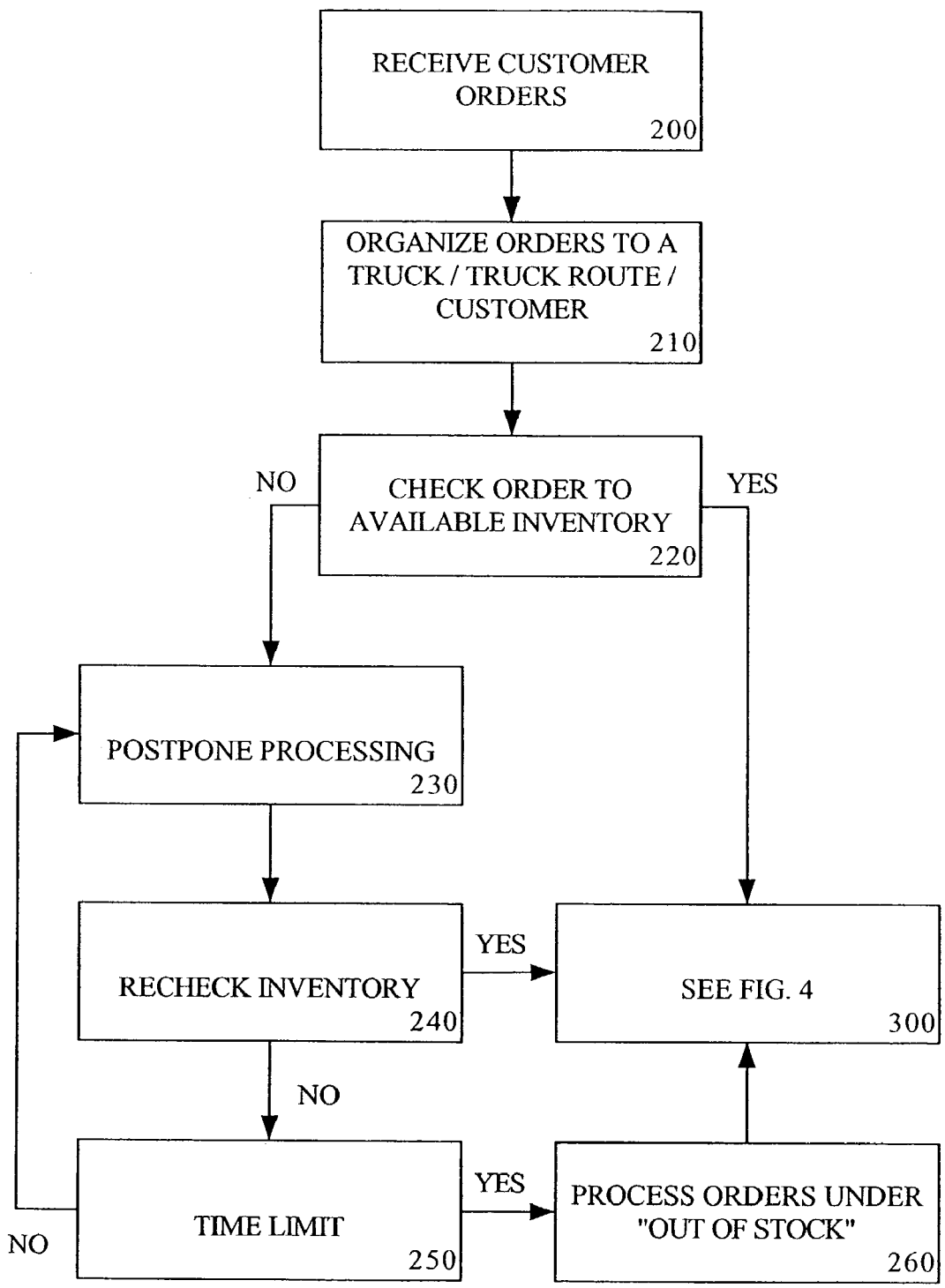
FIG. 3 is a block diagram illustrating a method for processing orders for containers according to the invention.
Figure 4:
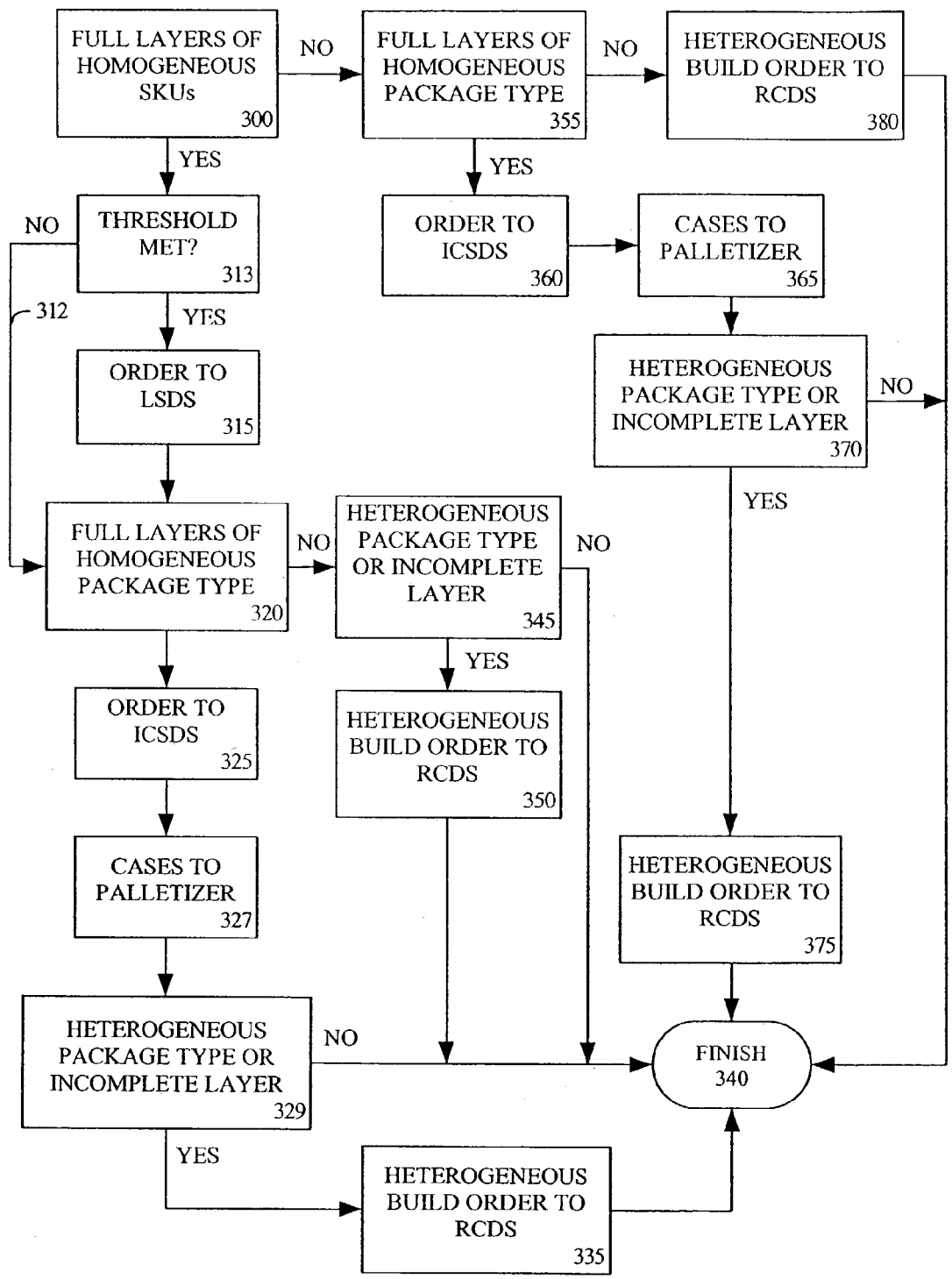
FIG. 4 is a block diagram illustrating a method for placing containers on pallets according to the invention.

A method according to the invention is illustrated in FIGS. 3–4. Customer order data is received in step 200. Orders can be organized for a particular truck, truck route, or customer in step 210. The customer order is compared to available inventory in step 220 to determine if all items are in inventory. If not, the system postpones processing in step 230. Inventory is rechecked in step 240. If inventory is not available, a timing step 250 can determine if a predetermined time limit has been reached. Step 250 can be a timing counter which counts the passage of time since the processing was postponed, or a clock-based timer which compares the current time to significant times for delivery operations, for example, the time at which a truck must depart or the end of a work shift. If the time step 250 indicates that the time limit has not been reached the process loops back to step 230. If the time limit has been reached, the process progresses to complete the order in step 260.

The method progresses from step 220 or step 260 to step 300 (FIG. 4), where it is determined whether there are full layers of homogeneous SKUs that must be supplied to fill the order. If so, the method can progress to step 313 where it is determined if a threshold number of layers of homogeneous SKUs is required for the pallet. If so, the method progresses to step 315 and the layers are supplied by the LSDS. The LSDS 18 typically will comprise only layers of containers having homogeneous SKUs, that is, containers of an identical product, quantity, and size. If the number of homogeneous SKU layers required for a pallet does not exceed the threshold, it can be more efficient to bypass the LSDS 18 in favor of supplying these cases from the ICSDS 10 to the palletizer 14. Also, the LSDS 18 will typically not have all SKUs, and if the order requires a full layer of an SKU that is not available from the LSDS 18, the LSDS must be bypassed. If the threshold in step 310 is not met or if the SKU is not available from the LSDS 18, the LSDS 18 is bypassed through branch 312.

The method then determines in step 320 whether full layers of homogeneous package type are required. Such containers are provided by the ICSDS in step 325 and are formed into layers and placed onto a pallet by the palletizer in step 327. The system determines in step 329 if the order requires heterogeneous package type containers or an incomplete layer. The system progresses to the RCDS in step 335 if such are necessary. The RCDS 22 places heterogeneous package types or incomplete layers of containers on the pallet in step 335. The heterogeneous package types can comprise layers having differing SKUs, or container size, shape or weight. The RCDS 22 is adapted to individually place these containers onto the pallet in a manner which best fits the pallet. The completed pallet is then sent to a finish step 340, which can be the shipping step in which the pallet is placed into a delivery truck or container for transport to the required destination. The finish step 340 can include such steps known in the art as wrapping or banding the pallet prior to shipping.

In step 320, if it is determined that full layers of homogeneous package type are not necessary, it is determined in step 345 if heterogeneous package types or incomplete layers are necessary. If so, these are supplied by the RCDS in step 350, after which the method progresses to the finish step 340.

If it is determined in step 300 that full layers of homogeneous package type are not necessary, it is determined at step 355 if full layers of homogeneous package type are necessary. If so, the order is sent to the ICSDS at step 360 and the containers are palletized by the palletizer 14 in step 365. It is determined at step 370 whether heterogeneous package types or incomplete layers are required to finish the order. If so, such are supplied by the RCDS at step 375 and the method proceeds to the finish step 340. If a determination is made at step 370 that heterogeneous package types or incomplete layers are not necessary, the method proceeds to the finish step 340. If at step 355 it is determined that full layers of homogeneous package type are not necessary, the method proceeds to step 380 and remaining containers are supplied by the RCDS, and the method then proceeds to the finish step 340.

Figure 5:
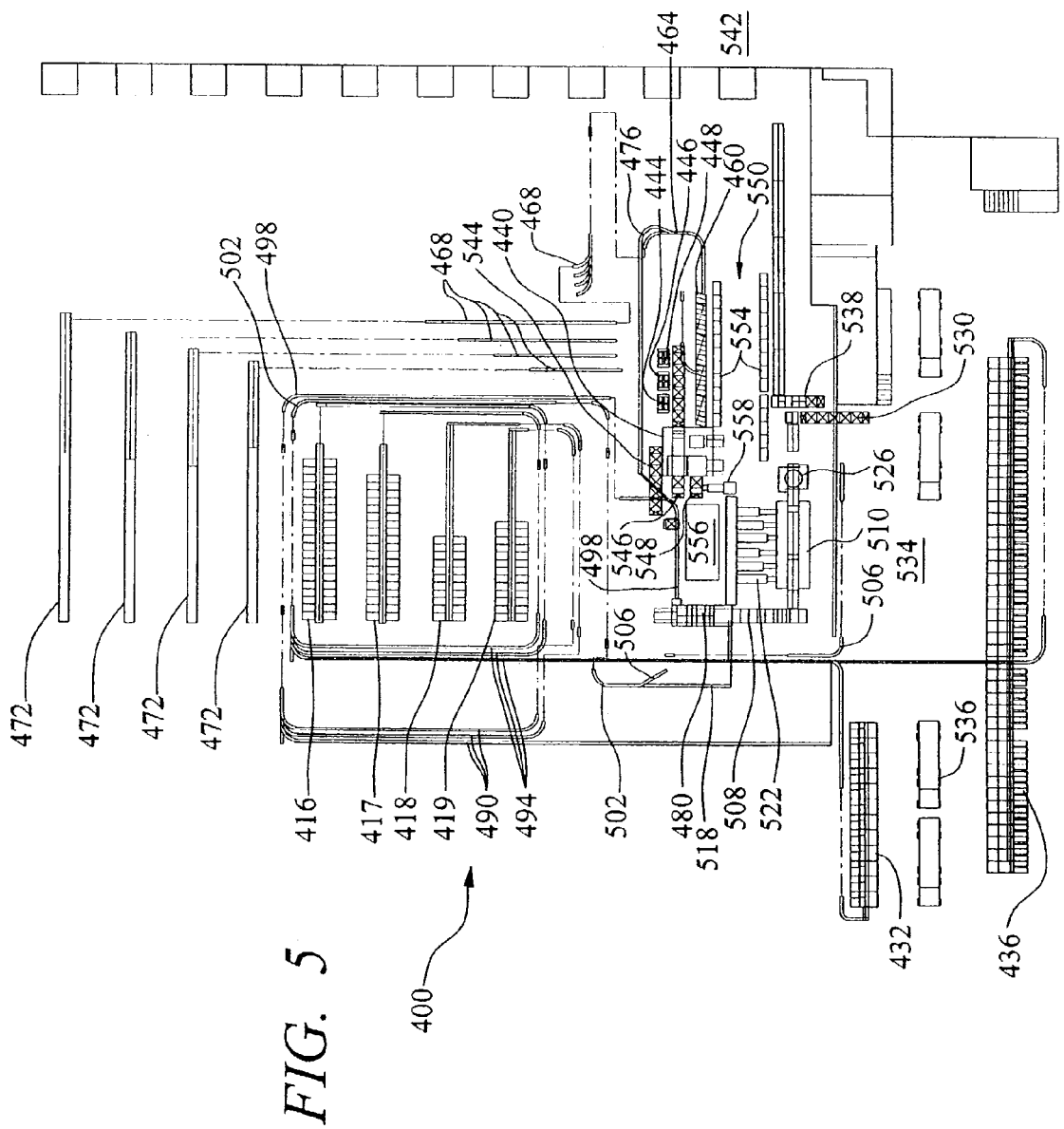
FIG. 5 is a top plan, exploded schematic of an automated storage and delivery system according to an alternative embodiment of the invention.

An alternative embodiment of the invention is shown in the top plan schematic shown in FIG. 5. The system 400 has banks 416–419 of VASRS towers as previously described, or other fully automated storage and delivery apparatus. The system 400 also has banks 432, 436 of semi-automated VASRS towers. A depalletizer 440 removes containers from the supply pallets. Empty pallets are stored by pallet stackers 444, 446, and 448.

Containers leaving the depalletizer 440 are unscrambled by an unscrambler 460 and sent by a conveyor 464 to the VASRS towers 416–419. The conveyor 464 connects to branching conveyors 468 which connect to the supply conveyors 472 which supply the containers to the top of the VASRS banks 416–419. A conveyor 476 can bypass the VASRS banks 416–419 and transport containers directly to the palletizer 480.

Containers leaving the fully automated VASRS banks 416–419 and semi-automated VASRS banks 432, 436 are transported to queuing conveyors 490, 494 until needed at the palletizer 480. The queuing conveyors 490 merge to a palletizer supply conveyor 498 which transports the containers to the palletizer 480. The queuing conveyors 494 merge to a supply conveyor 502 which transports the containers to the manual palletizing area 510. A branch 506 carries urgently needed containers directly to shipping area 534.

Pallets leaving the palletizer 480 are directed by a pallet conveyor 508 to a manual palletizing area 510. Individual containers are received from branch conveyor 518 and are lowered to the floor by suitable structure such as VASRS towers 522. There the containers are manually placed onto pallets. The pallets can then be passed to wrapping station 526. Pallet conveyor 530 transports the pallets to shipping area 534 to be loaded onto trucks 536. Pallet conveyor 538 transports pallets to shipping area 542.

Pallets are delivered to the depalletizer through a pallet que conveyor 544. Pallets leaving the depalletizer 440 through pallet discharge conveyors 546, 548 can be stored in pallet storage area 550. The pallet storage area 550 has a plurality of pallet storage positions 554. The pallets with the remaining containers are taken by an automated storage and retrieval system (ASRS) 558 to one of the pallet storage positions 554. Containers are taken from the pallet storage area 550 by the ASRS 558 to the gantry depalletizer 440. The ASRS 558 retrieves the necessary pallet from the appropriate pallet storage position 554 and brings it to the depalletizer 440. The depalletizer 440 removes the necessary number of layers of containers from the pallet and places them on a conveyor for delivery to the VASRS banks 416–419. The ASRS 558 then brings the pallet back to the storage position 554, unless the pallet is empty, in which case the empty pallet is retrieved for reuse.

A control system 556 can coordinate and control all system components to ensure that containers and pallets are routed to suitable locations at the appropriate times. The control system 556 can be a single system as shown, or can be comprised of multiple systems that are communicatively linked.

Figure 6:
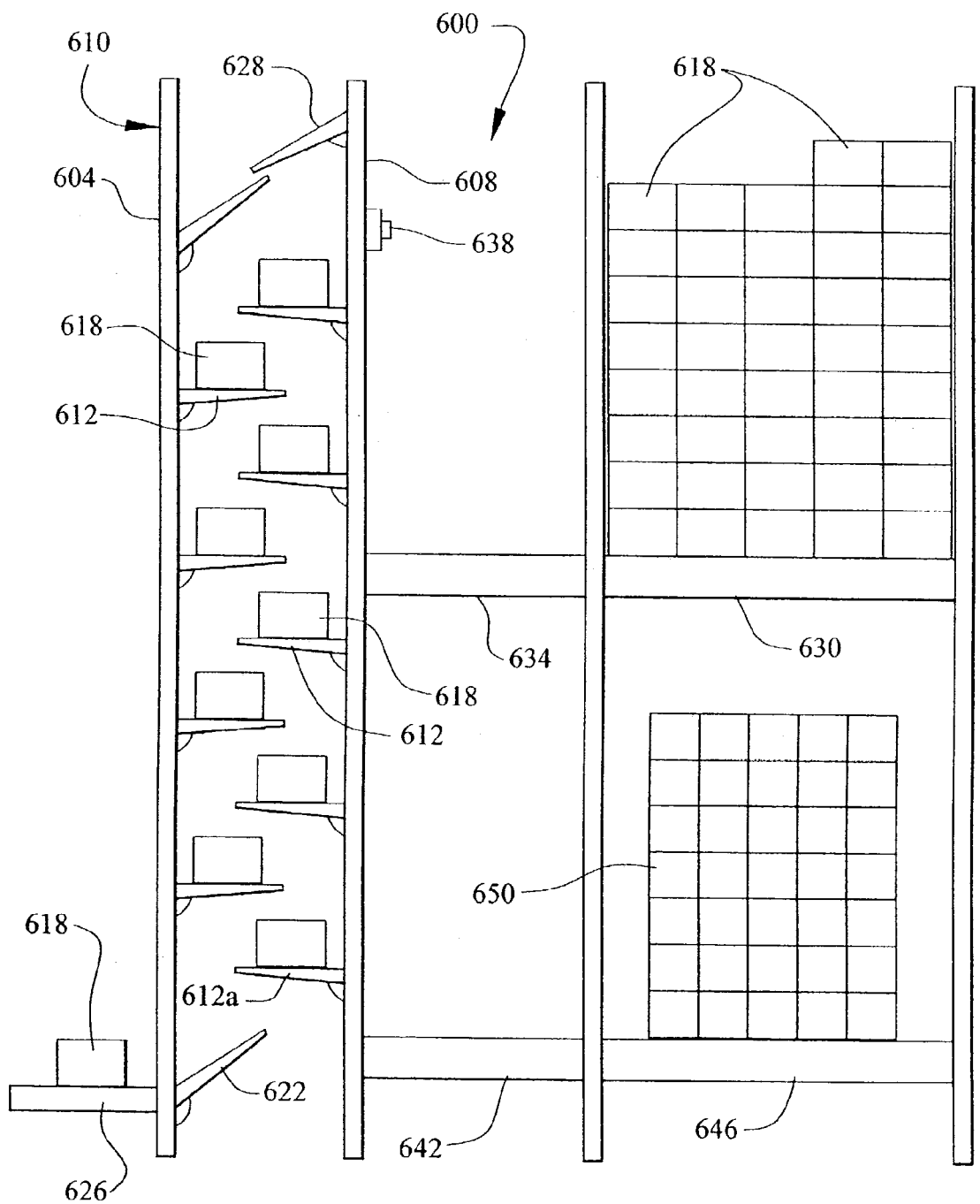
FIG. 6 is a side elevation of a semi-automated individual container storage and delivery system.

A semi-automated VASRS tower assembly 600 is shown in FIG. 6. The assembly includes at least one VASRS tower 610 comprising first and second tower sections 604, 608. Each of the tower sections 604, 608 supports a number of vertically spaced shelf trays 612. The shelf trays 612 support the containers 618 which are stacked on the trays 612 when loaded as shown. The shelf trays of each tower section 604, 608 face inwardly toward and are staggered relative to each other, and are mounted for pivotal movement about a horizontal axis and operated so that when a container 618 is dispensed from a bottom shelf tray 612a, the container 618 is carried by ramp 622 onto conveyor 626. Each higher tray beginning at the bottom and progressing upward one at a time, pivots to transfer its container to the upwardly tilted next lower shelf tray 612. As a container 618 is loaded at the top of the tower 610, the shelf trays 612 are operated to pass the container downwardly in zig zag fashion from one shelf tray 612 to another until the container 618 reaches the highest unloaded shelf tray 612. An upper container input location 628 serves as the entry point for containers into the tower 610, and can be a ramp as shown, other structure, or an open space for placement of containers 618 into the top of the tower 610.

A storage area 630 permits containers 618 to be stored in the immediate vicinity of the respective tower 610 in which the containers 618 are to be loaded. A walkway 634 is provided such that a workman can walk past each of the towers 610 to determine which tower is in need of containers. A signaling means 638 such as a light or a buzzer can provide an indication of when the tower 610 is in need of containers. The workman takes the containers 618 from the storage area 630 and places the containers into top of the respective tower 610. A lower level having a walkway 642 and storage area 646 can be provided to fill shorter towers (not shown), which can be positioned adjacent the taller towers 610, for containers 650 which are in lower demand and thereby need fewer storage spaces. The containers can be placed into the storage areas 630, 646 by any suitable means, but will typically be placed on pallets which are lifted into position by a lift vehicle.

Orders requiring full pallets of homogeneous SKUs can be filled by the container storage and delivery system of the invention. It is usually most efficient to determine if such pallets are available in a storage warehouse and to retrieve these pallets directly from the warehouse, rather than to build such pallets through the system.

The invention has been disclosed with reference to an exemplary system shown in the drawings and described in the present specification. It will be appreciated by one skilled in the art, however, that various modifications and rearrangements to the embodiment described herein are possible. The number and particular layout of the various components could be modified for the particular use. The system components are capable of being performed by various different mechanical equipment, both currently in existence and which may come into existence. The present invention provides a system and method which is capable of taking many different specific embodiments, in keeping with the many different container handling uses that are contemplated.

This invention can be embodied in other forms without departing from the spirit of the essential attributes thereof. Accordingly, reference should be had to the following claims, rather than to the foregoing specification, as indicating the scope of the invention.

We claim:

1. A method for storing and delivering containers, comprising the steps of:

providing an individual container storage and delivery system;

providing a palletizer for forming a group of containers from said individual container storage and delivery system into a layer or a partial layer, and placing this layer or partial layer onto a pallet;

providing a layer storage and delivery system for taking full layers of containers from a storage area and placing said full layers onto a pallet;

providing a robotic container delivery system for placing individual containers onto a pallet;

maintaining inventory data comprising position data for at least some containers in said system;

receiving customer order data;

determining at least one pallet configuration from said order data and said inventory data, said pallet configuration including layers of containers for said pallet configuration; and, if said configuration of containers includes layers of homogeneous SKUs, placing said homogeneous SKU containers on a pallet with said layer storage and delivery system;

if said configuration requires layers of homogeneous package type, placing said homogeneous package type containers on said pallet with said individual container storage and delivery system and said palletizer; and, if said configuration requires heterogeneous package types, placing said heterogeneous package types onto a pallet with said robotic container delivery system.

2. A method for storing and delivering containers, comprising the steps of:

providing an individual container storage and delivery system;

providing a palletizer for forming a group of containers from said individual container storage and delivery system into a layer or a partial layer, and placing this layer or partial layer onto a pallet;

providing a layer storage and delivery system for taking full layers of containers from a storage area and placing said full layers onto a pallet;

providing a robotic container delivery system for placing individual containers onto a pallet;

maintaining inventory data comprising position data for at least some containers in said system;

receiving customer order data;

determining at least one pallet configuration from said order data and said inventory data, said pallet configuration including layers of containers for said pallet configuration; and, if said configuration of containers includes layers of homogeneous SKUs, placing said homogeneous SKU containers on a pallet with said layer storage and delivery system;

if said configuration requires layers of homogeneous package type, placing said homogeneous package type containers on said pallet with said individual container storage and delivery system and said palletizer; and, if said configuration requires heterogeneous package types, placing said heterogeneous package types onto a pallet with said robotic container delivery system;

wherein, if said number of layers of homogeneous SKUs exceeds a predetermined threshold and said layers are available from said layer storage and delivery system, causing said layer storage and delivery system to place said homogeneous layers of homogeneous SKUs on a pallet and, if additional containers are required to complete said pallet configuration, directing said pallet from said layer storage and delivery system to said robotic container delivery system and causing said robotic container delivery system to place said containers onto said pallet; and, if said number of layers of containers does not exceed said predetermined threshold or if said layers are not available from the layer storage and delivery system, causing said individual container storage and delivery system to deliver containers to said palletizer and causing said palletizer to place said containers onto a pallet and, if additional containers are required to complete said pallet configuration, causing said conveyor system to direct said pallet to said robotic container delivery system for placing said additional containers onto said pallet.

3. The method of claim 1, further comprising the step of determining layer configurations for heterogeneous layers of containers and causing said robotic container delivery system to place said heterogeneous layers onto a pallet according to said layer configuration.

4. The method of claim 3, wherein said heterogeneous layers comprise at least one selected from the group consisting of incomplete layers, and full layers having at least two different package types.

5. The method of claim 1, wherein said individual container storage and delivery system is a vertically accumulating storage and dispensing apparatus.

6. The method of claim 1, further comprising the step of replenishing said individual container storage and delivery system with containers from a pallet storage area.

7. A method for storing and delivering containers, comprising the steps of:

providing an individual container storage and delivery system;

providing a palletizer for forming a group of containers from said individual container storage and delivery system into a layer or a partial layer, and placing this layer or partial layer onto a pallet;

providing a layer storage and delivery system for taking full layers of containers from a storage area and placing said full layers onto a pallet;

providing a robotic container delivery system for placing individual containers onto a pallet;

maintaining inventory data comprising position data for at least some containers in said system;

receiving customer order data;

determining at least one pallet configuration from said order data and said inventory data, said pallet configuration including layers of containers for said pallet configuration; and, if said configuration of containers includes layers of homogeneous SKUs, placing said homogeneous SKU containers on a pallet with said layer storage and delivery system;

if said configuration requires layers of homogeneous package type, placing said homogeneous package type containers on said pallet with said individual container storage and delivery system and said palletizer; and, if said configuration requires heterogeneous package types, placing said heterogeneous package types onto a pallet with said robotic container delivery system;

wherein after containers have bean placed on said pallet by said palletizer, directing said pallet to said layer storage and delivery system for placing full layers on said pallet.

8. The method of claim 7, wherein, after placing layers on said pallet in said layer storage and delivery system, directing said pallet to said robotic container delivery system for placing individual containers onto said pallet.

9. A method for storing and delivering containers, comprising the steps of:

providing an individual container storage and delivery system;

providing a palletizer for forming a group of containers from said individual container storage and delivery system into a layer or a partial layer, and placing this layer or partial layer onto a pallet;

providing a layer storage and delivery system for taking full layers of containers from a storage area and placing said full layers onto a pallet;

providing a robotic container delivery system for placing individual containers onto a pallet;

maintaining inventory data comprising position data for at least some containers in said system;

receiving customer order data;

determining at least one pallet configuration from said order data and said inventory data, said pallet configuration including layers of containers for said pallet configuration; and, if said configuration of containers includes layers of homogeneous SKUs, placing said homogeneous SKU containers on a pallet with said layer storage and delivery system;

if said configuration requires layers of homogeneous package type, placing said homogeneous package type containers on said pallet with said individual container storage and delivery system and said palletizer; and, if said configuration requires heterogeneous package types, placing said heterogeneous package types onto a pallet with said robotic container delivery system; and, determining high through-put containers, and maintaining full layers of said high through-put containers in said layer storage and delivery system.

10. A method for storing and delivering containers, comprising the steps of:

providing an individual container storage and delivery system;

providing a palletizer for forming a group of containers from said individual container storage and delivery system into a layer or a partial layer, and placing this layer or partial layer onto a pallet;

providing a layer storage and delivery system for taking full layers of containers from a storage area and placing said full layers onto a pallet;

providing a robotic container delivery system for placing individual containers onto a pallet;

maintaining inventory data comprising position data for at least some containers in said system;

receiving customer order data;

determining at least one pallet configuration from said order data and said inventory data, said pallet configuration including layers of containers for said pallet configuration; and, if said configuration of containers includes layers of homogeneous SKUs, placing said homogeneous SKU containers on a pallet with said layer storage and delivery system;

if said configuration requires layers of homogeneous package type, placing said homogeneous package type containers on said pallet with said individual container storage and delivery system and said palletizer; and, if said configuration requires heterogeneous package types, placing said heterogeneous package types onto a pallet with said robotic container delivery system; and, determining low through put containers, and maintaining said low through-put containers in a semi-automated vertically accumulating storage and delivery apparatus, and directing containers from said semi-automated storage and delivery apparatus to at least one of said palletizer and said robotic container delivery system.

11. The method of claim 1, further comprising the step of determining if full pallets of goods are necessary, and obtaining such full pallets from a storage area.

* * * * *